(12) United States Patent
Jactat et al.

(10) Patent No.: US 10,616,931 B2
(45) Date of Patent: *Apr. 7, 2020

(54) OPTIMIZED USER EQUIPMENT SUPPORTING RELAY COMMUNICATION, AND RELATED METHOD

(71) Applicant: NEC Corporation, Tokyo (JP)

(72) Inventors: Caroline Jactat, Berkshire (GB);
Benoit Lecroart, Berkshire (GB);
Thomas Delsol, Berkshire (GB); Lanto Rakotoharison, Berkshire (GB)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,013

(22) Filed: Apr. 14, 2017

(65) Prior Publication Data

US 2017/0303321 A1 Oct. 19, 2017

Related U.S. Application Data

(63) Continuation of application No. 14/423,515, filed as application No. PCT/JP2013/004578 on Jul. 29, 2013, now Pat. No. 9,642,127.

(30) Foreign Application Priority Data

Oct. 19, 2012 (EP) .................... 12306301

(51) Int. Cl.
*H04W 76/11* (2018.01)
*H04W 88/04* (2009.01)
(Continued)

(52) U.S. Cl.
CPC .............. *H04W 76/11* (2018.02); *H04B 7/15* (2013.01); *H04L 5/0094* (2013.01);
(Continued)

(58) Field of Classification Search
CPC ........ H04B 7/14; H04B 7/15; H04B 7/15507; H04B 7/2637; H04B 7/2653;
(Continued)

(56) References Cited

U.S. PATENT DOCUMENTS 8,009,630 B2 * 8/2011 Boariu ................. H04W 8/005
370/331
2006/0205408 A1 9/2006 Nakagawa et al.
(Continued)

FOREIGN PATENT DOCUMENTS

EP 2 296 403 3/2011
EP 2 434 796 A1 3/2012
(Continued)

OTHER PUBLICATIONS

International Search Report, PCT/JP2013/004578, dated Oct. 15, 2013.
(Continued)

*Primary Examiner* — Ashley Shivers
(74) *Attorney, Agent, or Firm* — Sughrue Mion, PLLC

(57) ABSTRACT

The invention relates to a method for relaying a communication in a network, wherein a user equipment (UER) relays a communication between a network node entity (eNB) and a target entity (UET), the method including the steps, generating a logical channel at least between the user equipment relay (UER) and the target entity (UET), and assigning at least one identifier (LC_ID_R) to said logical channel, and upon reception from the network node entity (eNB), at the user equipment relay (UER), of data received with said identifier (LC_ID_R), the user equipment relay (UER) forwards the received data to the target entity (UET).

8 Claims, 15 Drawing Sheets

(51) Int. Cl.
*H04B 7/15* (2006.01)
*H04L 5/00* (2006.01)
*H04L 12/28* (2006.01)
*H04W 72/04* (2009.01)
*H04W 16/26* (2009.01)

(52) U.S. Cl.
CPC ......... *H04L 12/2865* (2013.01); *H04W 16/26* (2013.01); *H04W 72/042* (2013.01); *H04W 72/048* (2013.01); *H04W 88/04* (2013.01)

(58) Field of Classification Search
CPC . H04W 16/26; H04W 84/0471; H04W 88/04; H04W 72/00; H04W 72/02; H04W 72/04; H04W 40/22; H04W 52/46; H04W 4/04; H04W 28/26; H04W 72/042; H04W 76/021; H04L 12/2865; H04L 12/2869; H04L 5/0094
See application file for complete search history.

(56) References Cited

U.S. PATENT DOCUMENTS

| | | | |
|---|---|---|---|
| 2010/0272006 A1 | 10/2010 | Bertrand et al. | |
| 2011/0007692 A1* | 1/2011 | Seok | H04W 40/22 370/328 |
| 2011/0274032 A1* | 11/2011 | Leng | H04B 7/15542 370/315 |
| 2011/0280201 A1 | 11/2011 | Luo | |
| 2012/0014281 A1 | 1/2012 | Chun | |
| 2012/0020711 A1 | 1/2012 | Thayer et al. | |
| 2012/0093070 A1 | 4/2012 | Huang | |
| 2012/0207100 A1 | 8/2012 | Hakola et al. | |
| 2012/0315841 A1* | 12/2012 | Zhou | H04B 7/2606 455/11.1 |
| 2013/0016649 A1 | 1/2013 | Damnjanovic | |
| 2014/0029586 A1 | 1/2014 | Loehr | |
| 2014/0241254 A1* | 8/2014 | Kaur | H04L 1/1812 370/329 |

FOREIGN PATENT DOCUMENTS

| | | |
|---|---|---|
| JP | 2009506609 A | 2/2009 |
| WO | WO 2005/053338 | 6/2005 |
| WO | WO 2006/043903 | 4/2006 |
| WO | 2010028690 A1 | 3/2010 |
| WO | WO 2010/107357 | 9/2010 |
| WO | WO 2011/033630 | 3/2011 |
| WO | 2011/070308 A1 | 6/2011 |
| WO | WO 2011/077066 | 6/2011 |

OTHER PUBLICATIONS

Fujitsu, Multiplexing for Un Interface, [online]. 3GPP TSG-RAN WG2 Meeting #69 R2-101454, Feb. 22, 2010, [retrieved on Oct. 8, 2013]. Retrieved from the Internet: <URL:http://www.3gpp.org/FTP/tsg_ran/WG2_RL2/TSGR2_69/Docs/R2-101454.zip>.
Alcatel-Lucent Shanghai Bell, Alcatel-Lucent, Consideration on traffic multiplexing for relay operation, [online]. 3GPP TSG-RAN WG2#67 R2-094343, Jun. 3, 2009, [retrieved on Oct. 8, 2013]. Retrieved from the Internet: <URL:http://www.3gpp.org/FTP/tsg_ran/WG2_RL2/TSGR2_67/Docs/R2-094343.zip>.
3GPP TR 36.806 V9.0.0 (Mar. 2010), 3rd Generation Partnership Project; Technical Specification Group Radio Access Network; Evolved Universal Terrestrial Radio Access (E-UTRA); Relay Architectures for E-UTRA (LTE-Advanced) (Release 9).
Extended European Search Report, EP12306301.8, dated Apr. 9, 2013.
Communication dated May 25, 2018, from the European Patent Office in counterpart European Application No. 13846955.6.
Notification of Reasons for Refusal dated Sep. 18, 2018 from the Japanese Patent Office in counterpart application No. 2018-011354.
Notice of Reasons for Refusal dated Nov. 5, 2019 issued by the Japanese Patent Office in counterpart application No. 2019-021667.
Communication dated Oct. 24, 2019 issued by the Intellectual Property Office of India in counterpart application No. 1109/DELNP/2015.
Communication dated Jan. 14, 2020, from the Japanese Patent Office in Application No. 2019-021667.

* cited by examiner

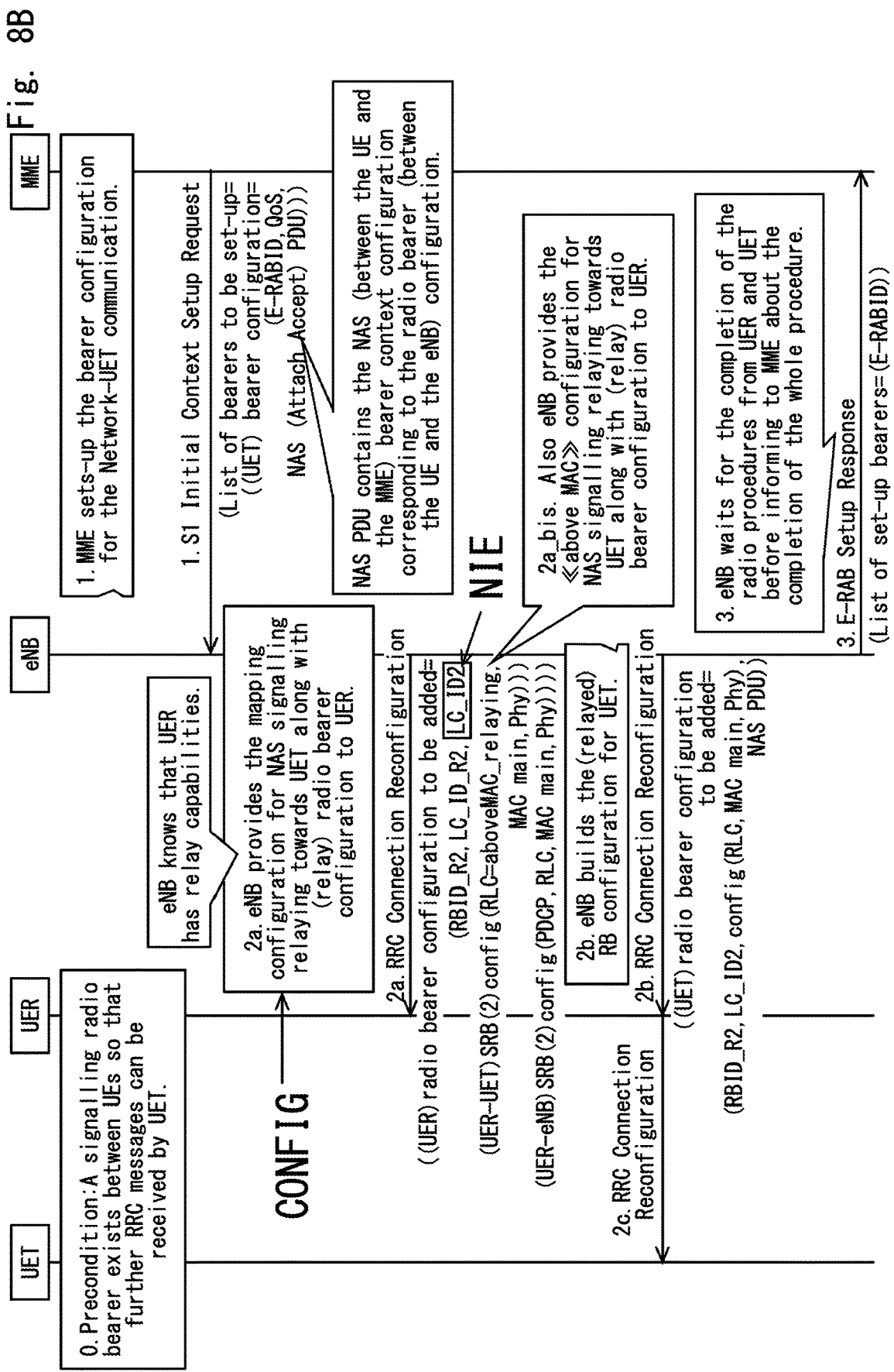

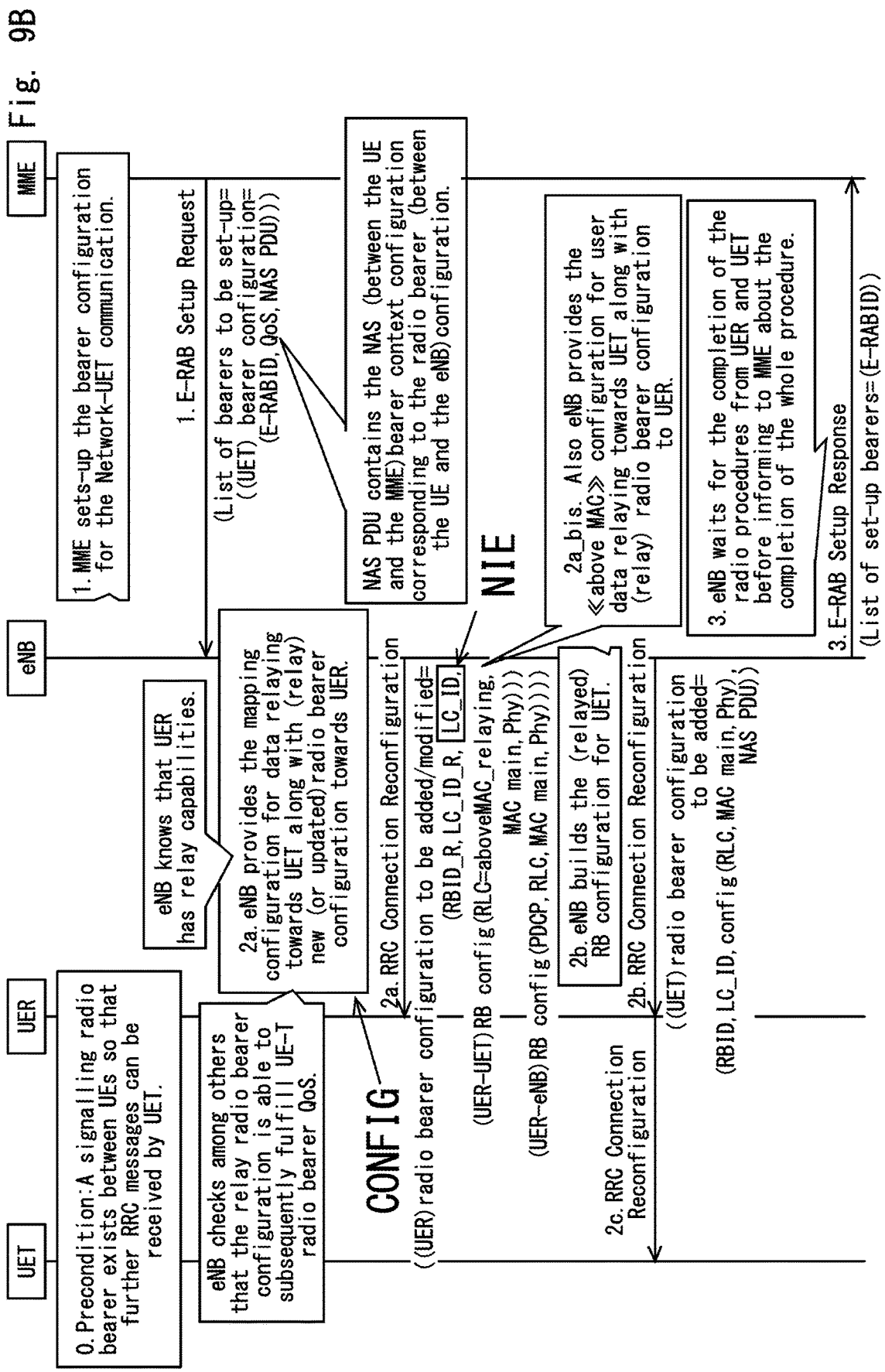

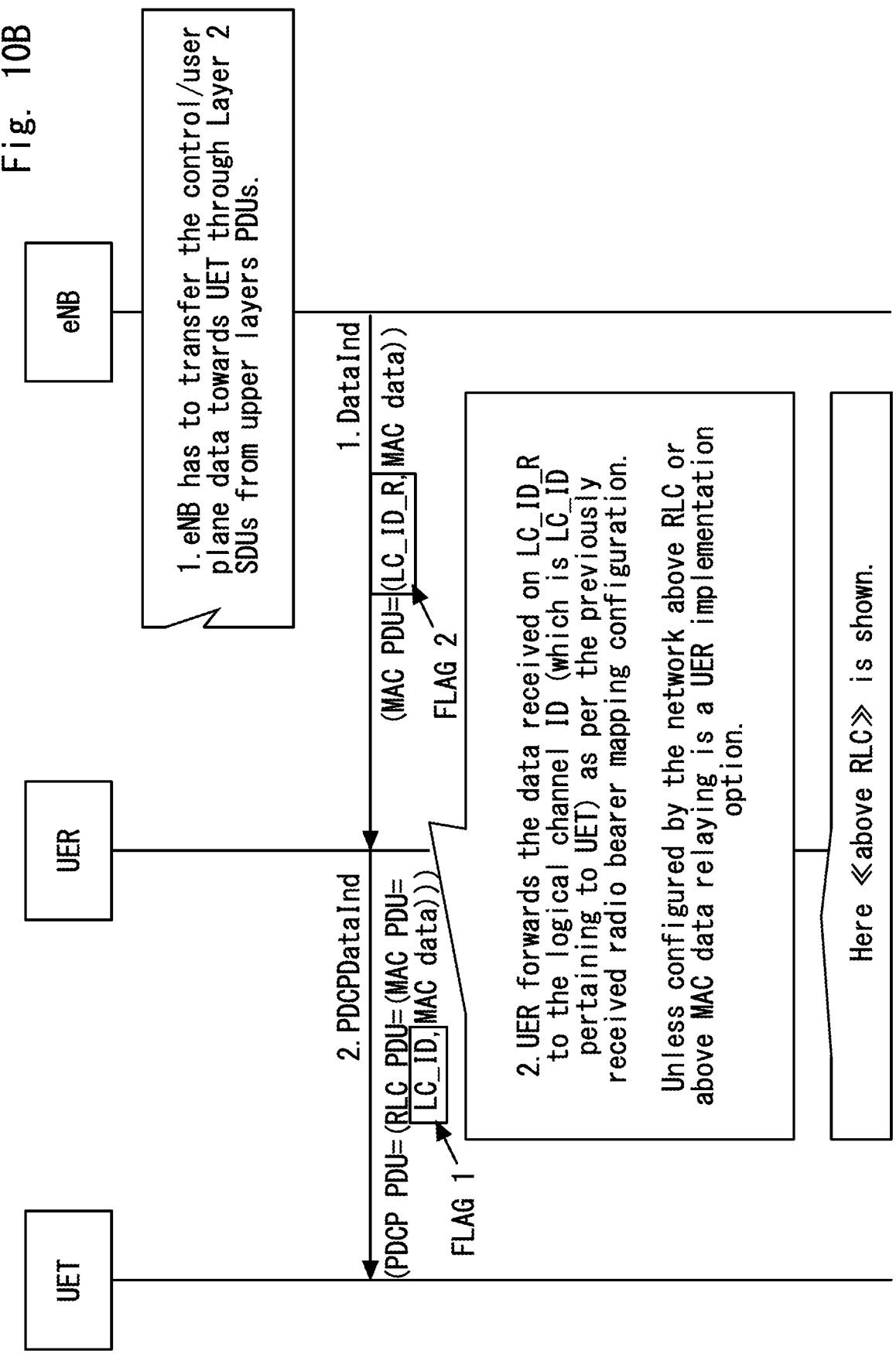

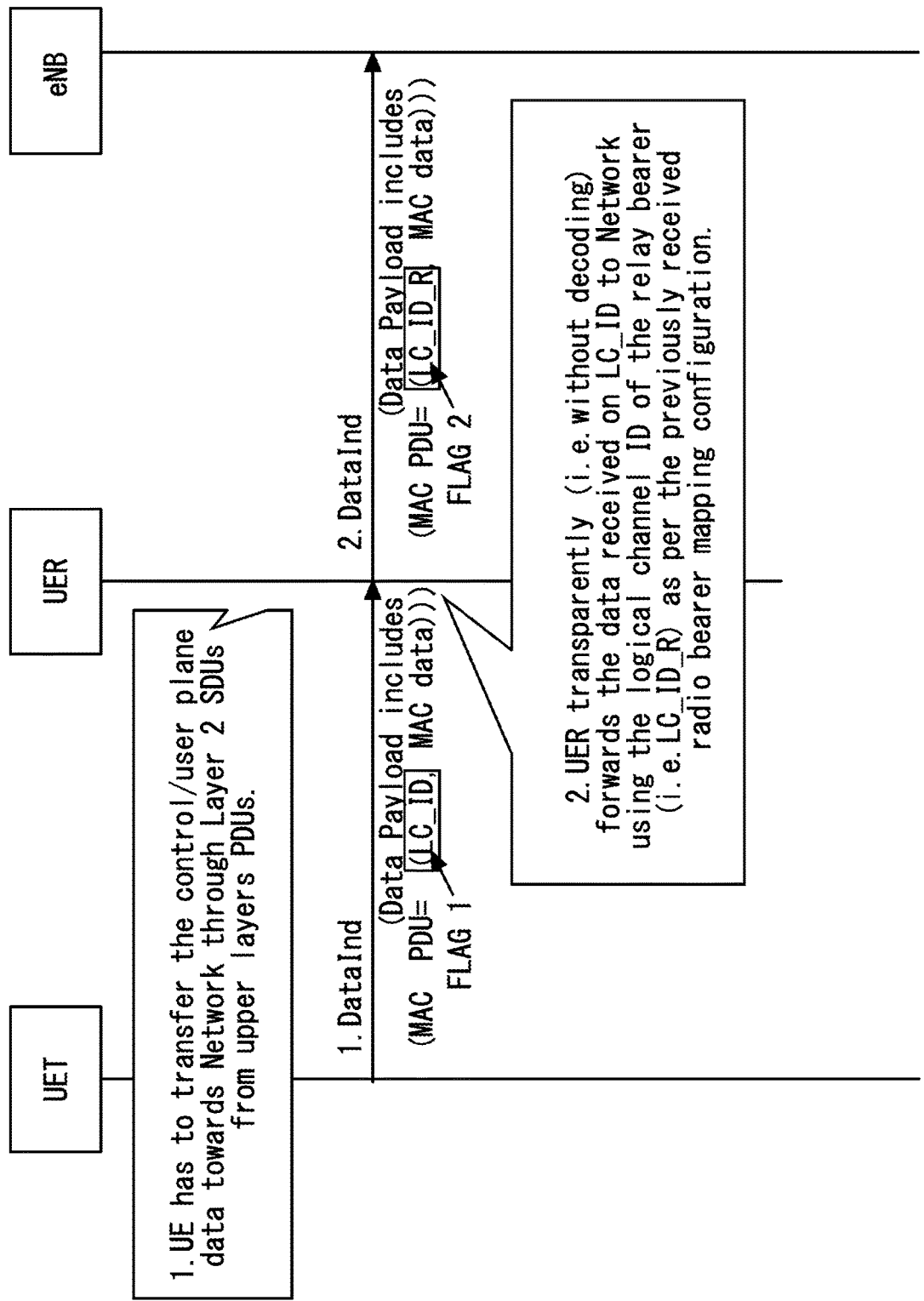

OPTIMIZED USER EQUIPMENT SUPPORTING RELAY COMMUNICATION, AND RELATED METHOD

TECHNICAL FIELD

The present invention generally relates to access networks and more particularly to relaying provided by a terminal used as a relay node. Such a terminal is called hereafter "user equipment relay" (UER).

It finds applications, in particular, in Radio Access Network (RAN) where base stations cannot cover some geographical areas in a network and further relay means are needed to ensure the transmission of a communication between a base station and a target terminal or a target node, called hereafter "target" (UET).

BACKGROUND ART

The present invention can find applications related to relaying aspects for communication via a mobile device used as a relay node in a network, such as, for example a 3GPP LTE network.

LTE (for "Long Term Evolution"), marketed as 4G LTE, is a standard for wireless communication of high-speed data for mobile phones and data terminals. It is based on older network technologies (such as the universal mobile telecommunication system (UMTS)), increasing the capacity and speed using a different radio interface together with core network improvements. Optimized components from the UMTS used in the LTE are signalled by the prefix "evolved". For example, a base station transmitting communications as a NodeB in the UMTS is called an "eNodeB" in the LTE.

Such an evolution has an influence on the communication protocol layers stack also. In the 3GPP LTE network, it can be spitted into seven different layers constituting the Open Systems Interconnection (OSI) model. It is recalled that an OSI model is a prescription of characterizing and standardizing the functions of a communications system. Similar communication functions are grouped into logical layers. A layer serves the layer above it and is served by the layer below it.

Every layer has to offer the upper layers the service of information transmission between a user equipment (UE) and the network. Therefore, upper layers need channels from the lower layers to communicate with the UE. For example, Layer 3 offers higher layers channels that are called radio bearers (RB) for the transfer of network data. Network data can be either control data for the configuration of the network or user data (for example telecommunication data). Layer 2 offers logical channels onto which radio bearers can be mapped. Therefore, the service access points between Layer 2 (reference "L2" in FIG. 3) and upper layers are RBs. A more detailed description of such OSI layers will be given with respect to FIG. 3 presented hereafter.

In fact, FIG. 2 illustrates a structure of a radio interface protocol between the terminal and the E-UTRAN according to the 3GPP radio access network standards. As shown in FIG. 2, the radio interface protocol has vertical layers including a physical layer, a data link layer, and a network layer, and has horizontal planes including a user plane (U-plane) for transmitting user data and a control plane (C-plane) for transmitting control information.

The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model. The first layer (L1), or the physical layer, provides an information transfer service to an upper layer by using various radio transmission techniques. The physical layer is connected to an upper layer, called a medium access control (MAC) layer, via a transport channel.

The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels, and provides allocation of the MAC parameters for allocation and re-allocation of radio resources. The MAC layer is connected to an upper layer, called the radio link control (RLC) layer, via a logical channel.

Various logical channels are provided according to the type of information transmitted. In general, a control channel is used to transmit information of the control plane, and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH) or a shared channel control channel.

The BCCH provides information including information utilized by a terminal to access a system. The PCCH is used by the UTRAN to access a terminal.

In a 3GPP LTE network, a network node such as the evolved NodeB (eNB) has the role of transmitting/receiving the data and signalling from the core network (CN) to the User Equipments (UEs) which are under its radio cell coverage, or from the UEs to CN. A user equipment (UE) is a terminal such as a telephone, a smartphone, a connected computer, a tablet, etc.

FIG. 1 gives an overview of the network between the UE and the CN. Furthermore, UEs need to transmit/receive data and/or signalling to/from the eNB whenever a communication is required (e.g. to register, update registration, establish a data session or a voice call). For example, in FIG. 1, $UE_{A1}$ and $UE_{A2}$ are located within cell A and are therefore using $eNB_A$ to communicate with the network.

SUMMARY OF INVENTION

Technical Problem

However, due to some factors (e.g. environment, path loss, power limitation), the cell coverage may be limited or there may be some regions where the signals from the eNB cannot be decoded by the UEs. For example, in FIG. 1, $UE_6$ is not located within a cell. This UE is therefore out of the networks coverage. Moreover, since eNB gathers all communication, its resources may become limited or insufficient. Consequently, there may be fewer services for users and the ongoing communication/applications may suffer of latency for instance.

In order to deal with the problems quoted before, the 3GPP group introduced Relay Node entities (which are usually Relay Base Stations) in the following document: Technical Specification Group Radio Access Network; Evolved Universal Terrestrial Radio Access (E-UTRA) and Evolved Universal Terrestrial Radio Access Network (E-UTRAN)—Overall description.

Instead of having UEs to eNB direct communication, transmitted data and/or signalling can pass through another node (the Relay Nodes) before reaching the target node (now called the Donor eNB or DeNB). For eNB to UEs communication, transmitted data and/or signalling can pass through the Relay Nodes before reaching the UEs. The Relay Node (RN) can be fixed or mobile.

With such RN, the RN's equipment capabilities (such as memory or processing capacities) are significantly consumed. Therefore, if such an RN were also fully used as a UE, the user might suffer from a lack of his equipment capabilities. As the data relaying is done at the IP level layer (IP for "Internet Protocol") which is a layer above L2 as shown in FIG. 3, the equipment has to encode and decode information at IP level if it were used as a relay. Thus, the problem would be moved simply from the eNB to the UE and induced latency also.

Solution to Problem

The invention aims to improve the situation.

To address these needs, a first aspect of the present invention relates to a method for relaying a communication in a network, wherein a user equipment relays a communication between a network node entity and a target entity, the method including the steps: generating a logical channel at least between the user equipment relay and the target entity, and assigning at least one identifier to said logical channel, and upon reception from the network node entity, at the user equipment relay, of data received with said identifier, the user equipment relay forwards the received data to the target entity.

The data to be communicated can be control data (signalling data for example) and/or user data (voice and/or multimedia and/or content data for example).

The network can be an LTE network (as described in the examples hereafter), but also any network.

The user equipment relay can be a telephone, a smartphone, a tablet, a computer, a game station, or any device which is able to relay data between two network entities.

The network node entity can be for example a base station, an eNodeB in a LTE network, but also another user equipment relay in a hoping scheme (several user equipment relays to forward a communication to a target).

The target entity can be another user equipment, but possibly also a base station (or more generally a network node) for example in a case where a communication between two base stations becomes impossible and a relay from a user equipment is needed.

Therefore, such a relaying function using a user equipment can be a solution to improve the cell coverage or provide the network with offloading alternative.

Of course, the network node entity is deemed to have a radiofrequency link (direct or indirect link) with the user equipment relay, and the user equipment relay is deemed to have a radiofrequency link with the target entity.

In an embodiment, reversely, the method can further include the steps: generating a logical channel between the user equipment relay and the network node entity, and assigning an identifier to said logical channel, and upon reception from the target entity, at the user equipment relay, of data received with said identifier, the user equipment relay forwards the received data to the network node entity.

The terms "generating a logical channel" can be understood, in a general way, as aiming inter alia a declaration of a radiofrequency link to root data through that link. In a specific embodiment, at least one radio bearer between the user equipment relay and the target entity can be configured with generating the aforesaid logical channel.

In that embodiment, the step of generating said logical channel can further include configuring: at least one radio bearer between the user equipment relay and the target entity, and optionally, a radio bearer between the user equipment relay and the network node entity.

In an embodiment, the method can further include the step of receiving from the network node entity the identifier of the logical channel, and parameters for setting up said radio bearers.

Therefore, a new information element (e.g. the logical channel identifier inter alia) can be created for the establishment of the radio bearer(s) used for the relay, and that new information element can be included in a message which can be usually intended for the establishment of the radio bearers used without relay between a user equipment and a network node entity.

Such a message can be advantageously, in an embodiment, of a type of a "Radio Resource Control" signalling message sent from said network node entity to the user equipment relay. That kind of message already exists and is usually sent from a base station (e.g. an eNodeB in a LTE network). It can thus include the logical channel identifier(s) and radio bearer(s) parameters.

More particularly, the signalling message can be a "Radio Resource Control Connection Reconfiguration" message.

Such a message can be received directly from a base station if this base station is the aforesaid network node entity, or can be either received from another network node entity (e.g. another user equipment relay in a hoping scheme) which simply relays that message.

Moreover, according to an embodiment of the invention, data are relayed through the user equipment relay according to a protocol of a layer 2 in an Open Systems Interconnection model (OSI).

Therefore, in a general way, there is no need to decode and encode data received at the user equipment and a simple identifier of a logical channel added to the received data is sufficient for the user equipment to make it understand that it should simply relay the received data through that logical channel.

Therefore, there is no need to carry out deep modifications of already existing systems to perform the relay with a user equipment thanks to these embodiments of the invention.

In fact, in a first embodiment data can be relayed through the user equipment relay according to a protocol of an above MAC layer, and the logical channel identifier can be included in a MAC Protocol Data Unit.

In a second embodiment, data are relayed through the user equipment relay according to a protocol of an above RLC layer, and the logical channel identifier can be included in a RLC Protocol Data Unit. The choice between the first and the second embodiment can be decided on the basis of optimization purpose and/or according to the capabilities and/or construction of equipments in the network. In a possible embodiment, a dynamic choice can be performed (for example according to a user equipment relaying capabilities) and the protocol layer to be used for relaying at the user equipment relay can be configured by the network (for example by the network node entity if it is a base station, or by the core network).

In an embodiment, the dynamic choice between "above-mac" and "above-RLC" configurations can be performed thanks to a transmission of information related to a used protocol layer configuration, such information being included in a message of a type of a "Radio Resource Control" signalling message sent from the network node entity to the user equipment relay, for example a "Radio Resource Control Connection Reconfiguration" message as explained above.

The present invention aims also at a computer program product, including instructions for performing the method according to any embodiment indicated above, when run by a processor.

For example, the present invention can be performed in a user equipment which can be suitably programmed to that end. At least a part of the instructions of the aforesaid program product can be stored in a ROM memory and run by a processor of the user equipment.

The invention aims thus at a user equipment also, including means for relaying a communication in a network (radiofrequency means such as one or several antennas and communication interfaces), between a network node entity and a target entity, the user equipment further including means (e.g. at least a storage memory and a processor) at least for:

upon reception from the network node entity of data received with an identifier of a logical channel between the user equipment relay and the target entity, the user equipment relay forwards the received data to the target entity.

Therefore, the user equipment relay includes specific means for interpreting the logical channel identifier, so as to forward directly data received from the network node entity and intended to the target entity (without decoding/encoding).

In an embodiment, the user equipment relay can further include means for generating a logical channel at least between the user equipment relay and the target entity, and assigning at least one identifier to that logical channel.

In another embodiment, a base station can generate the logical channel and can send data related to the logical channel to the user equipment relay so as to interpret the logical channel identifier as explained above.

Therefore, the present invention aims also at a base station including means for determining a user equipment for relaying a communication in a network between a network node entity and a target entity, the base station including means for determining further a logical channel between the user equipment relay and the target entity, and assigning at least one identifier to said logical channel.

Such a base station (e.g. an eNodeB in a LTE network) can be used for determining a best user equipment for relaying a communication to a target. Furthermore, the base station can also calculate the radio bearers parameters and define, finally, the logical channel for the relay.

The base station according to the invention can further include means for sending a "Radio Resource Control" signalling message including said identifier, intended to the user equipment relay, according to an embodiment indicated above.

The calculations of the radio bearers parameters and more generally of the logical channels configurations can be performed also at the core network and the present invention aims thus also at a core network including means for determining data related to at least a logical channel between a user equipment relay and a target entity, the user equipment being intended to be used as a relay for relaying a communication in the network between a network node entity and the target entity.

Advantageous Effects of Invention

According to the Invention, one or more of the above-mentioned problems is/are ameliorated or overcome.

BRIEF DESCRIPTION OF DRAWINGS

The present invention is illustrated by way of example, and not by way of limitation, in the figures of the accompanying drawings, in which like reference numerals refer to similar elements and in which:

FIG. 8B is a flowchart representing the configuration for NAS signalling of a relay in an "above MAC" case;

FIG. 9B is a flowchart representing the configuration for data relaying of a relay in an "above MAC" case;

FIG. 10B is a flowchart representing data relaying in an "above RLC" case in the downlink direction;

FIG. 11 is a flowchart representing data relaying in an "above MAC" case in the uplink direction.

DESCRIPTION OF EMBODIMENTS

Figure 1:
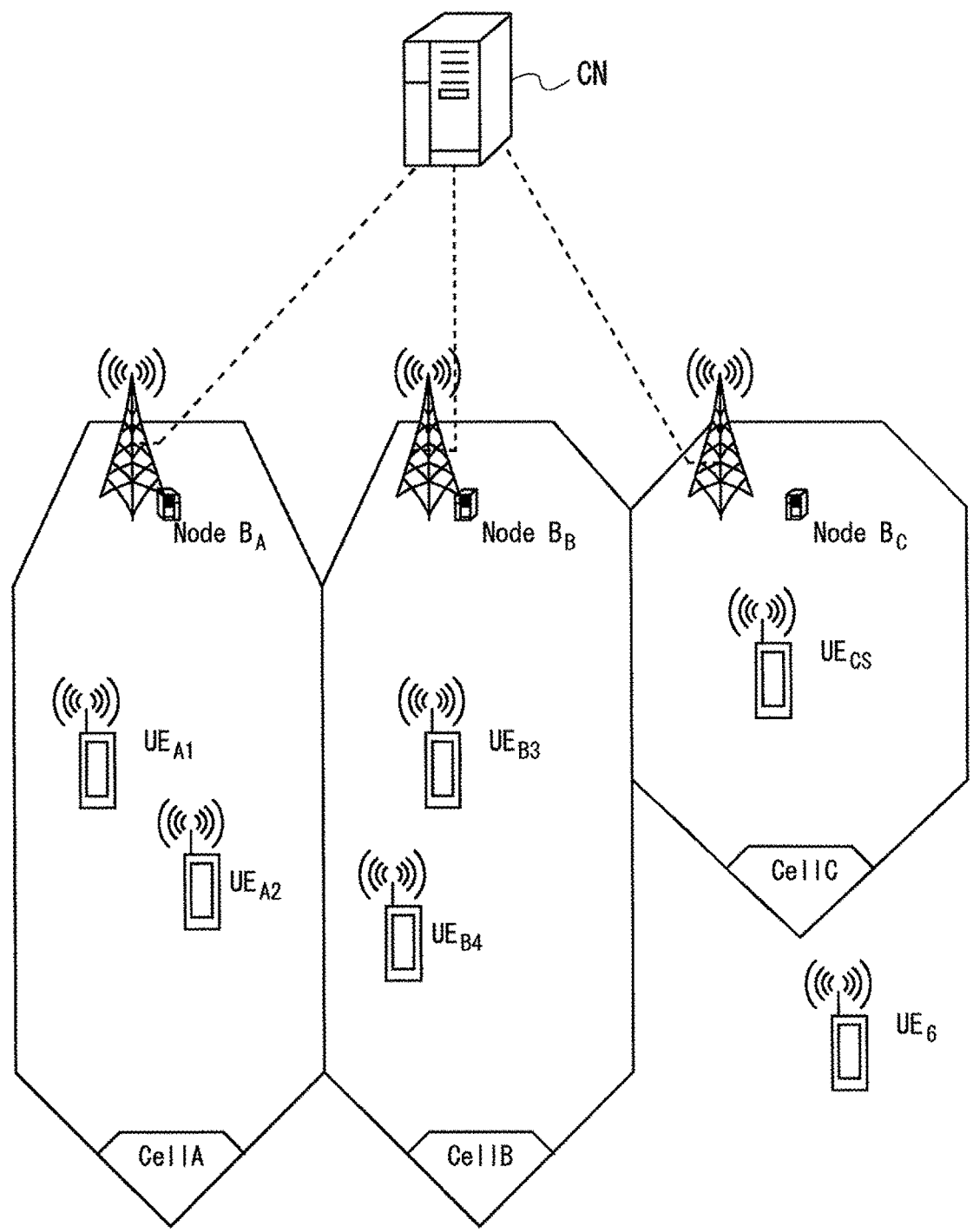
FIG. 1 represents a conventional network according to the prior art.
Figure 2:
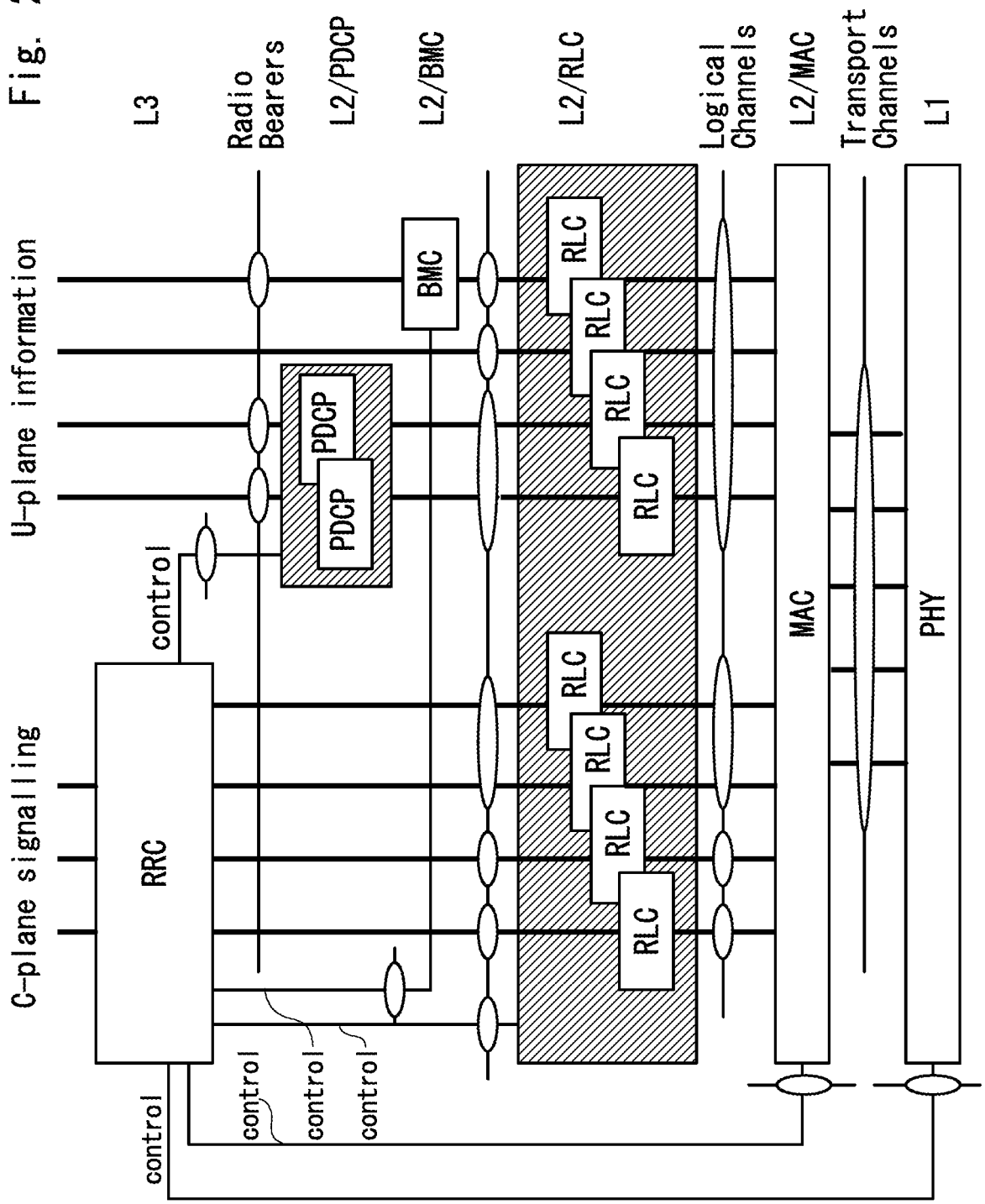
FIG. 2 represents a conventional radio interface protocol.
Figure 3:
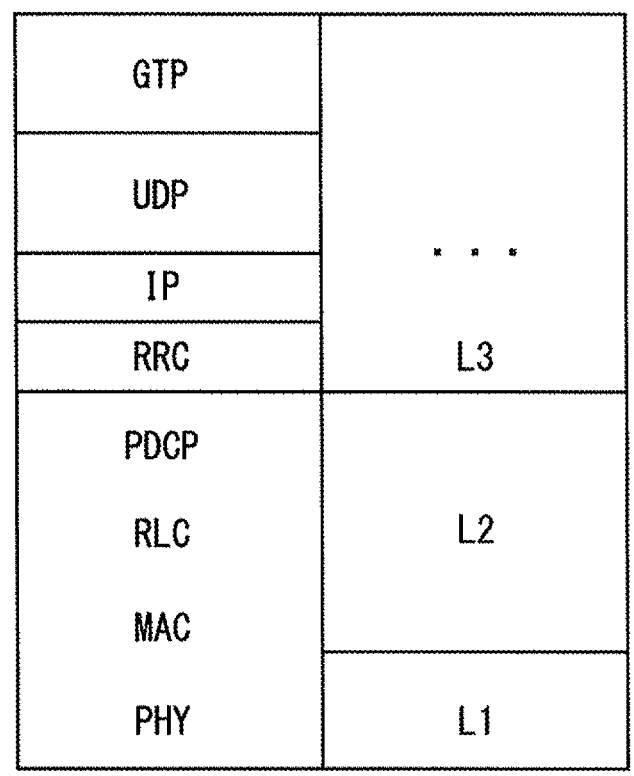
FIG. 3 represents LTE/UMTS sub-layers of layers 2 and 3.
Figure 4:
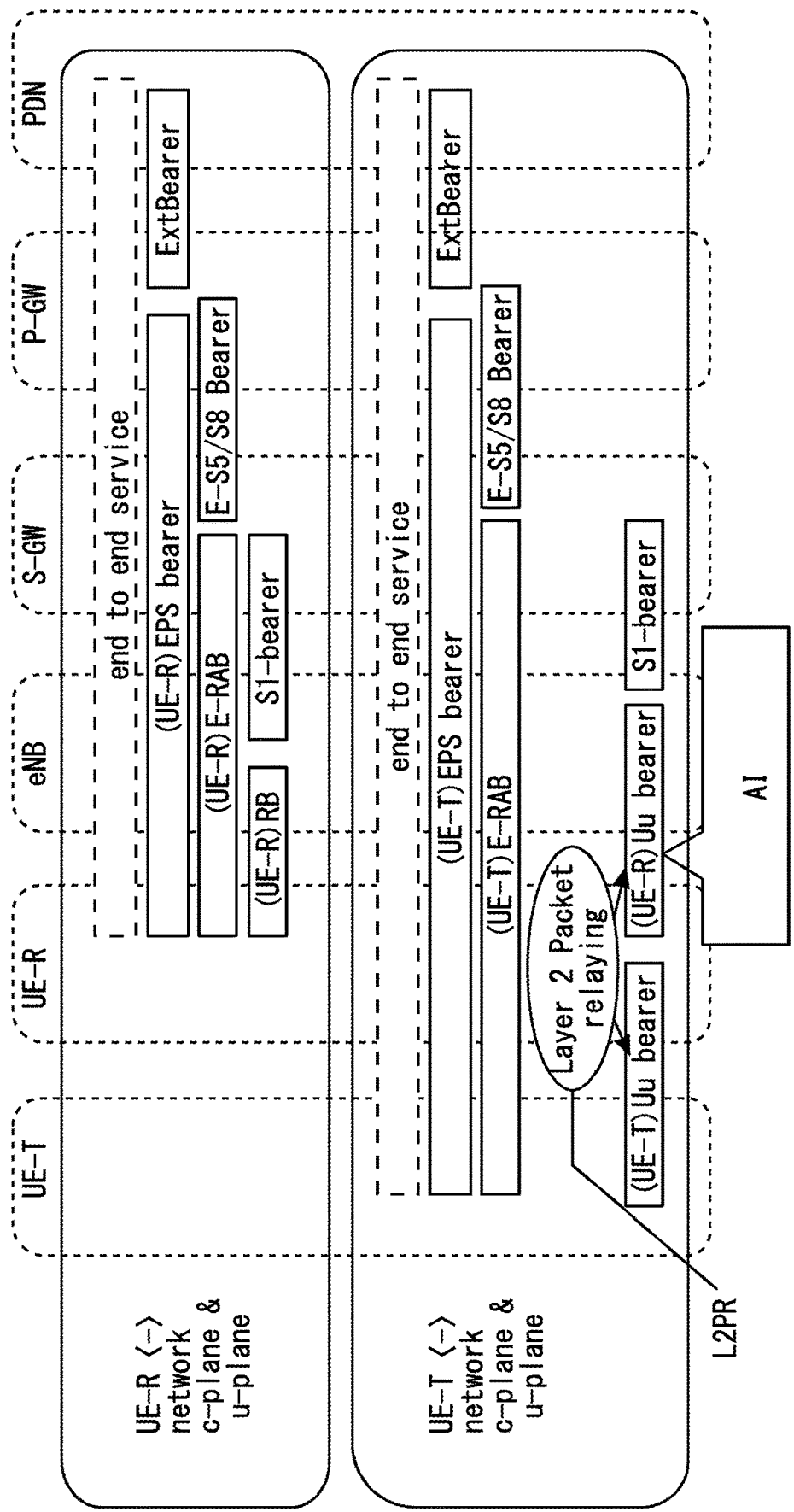
FIG. 4 represents radio bearers used for communications.

Referring to FIG. 4, a network node entity such as for example a base station (an evolved NodeB (eNB) for example in a LTE network) is establishing a bearer configuration for a user equipment UER to be used as a relay between the network node entity eNB and a target entity UET which can be a user equipment or a relay node (for example another UE relay, or a base station).

When the target UET needs the relay of the relay UER, radio bearers (RB) have to be adapted in order to carry out control and transmit user data from the eNB to the UET (in the downlink case) or from the UET to the eNB (in the uplink case). In the following description, the downlink case will be described but the same reasoning can be symmetrically applied for the uplink case.

In an embodiment, the relay is fulfilled by creating two radio bearers: one radio bearer between UET and UER and one radio bearer between UER and eNB. These bearers are relayed in UER. The relay can be processed in the Packet Data Convergence Protocol (PDCP) sub-layer (the higher sub-layer included in layer 2) or in the Radio Link Control (RLC) sub-layer.

UER relays UET to eNB traffic either above the Media Access Control (MAC) sub-layer, or above the Radio Link Control (RLC) sub-layer (both of these sub-layers are included in so-called "Layer 2" (L2)). The security of the traffic is ensured by the end to end PDCP layer between UET and eNB. Therefore, users cannot have access to the relayed data because these data do not reach layers 4 to 7 (application layers being easier to access).

Usually (in the case of a mere communication between an eNB and a UER without relay), some messages are dedicated to establish the communication between the eNB and a user equipment. For example, Radio Resource Control (RRC) signaling messages are usually used for connection establishment and release or for radio bearer establishment/reconfiguration and release. Therefore, RRC signaling messages are inter alia used for the establishment and reconfiguration of radio bearers between an eNB and a UE.

In an embodiment, RRC signaling messages are used to establish, configure or reconfigure radio bearers used for the relay. These radio bearers will carry the communication between the eNB and the UER and between the UER and the UET.

As the UER is a not a dedicated device only used for relaying, RRC signaling messages have to be modified for the UER so that the UER can interpret that it will have to process as a relay for some radio bearers. Therefore, new information element has to be added in the RRC signaling messages. For example, the new information elements can be included in the eNB to UER RRC Connection Reconfiguration message.

FIG. 4 highlights differences between the usual use of radio bearers without relay (UER<->network c-plane and u-plane in FIG. 4) and the use of radio bearers with the relay of UER (UET<->network c-plane & u-plane in FIG. 4).

When the relay is processed, the radio bearer used between the eNB and the UER contains added information in order to perform the relay. As specified above, the establishment of the radio bearers can be processed by adding new information in the RRC signaling message. As the RRC handles the control plane signaling of Layer 3, the establishment of the radio bearers for the relay is processed by a layer 3 protocol. The establishment is processed at layer 3 but the relay of data is processed at layer 2, optionally above the MAC sub-layer or above the RLC sub-layer, according to two alternative implementations described below.

Figure 5:
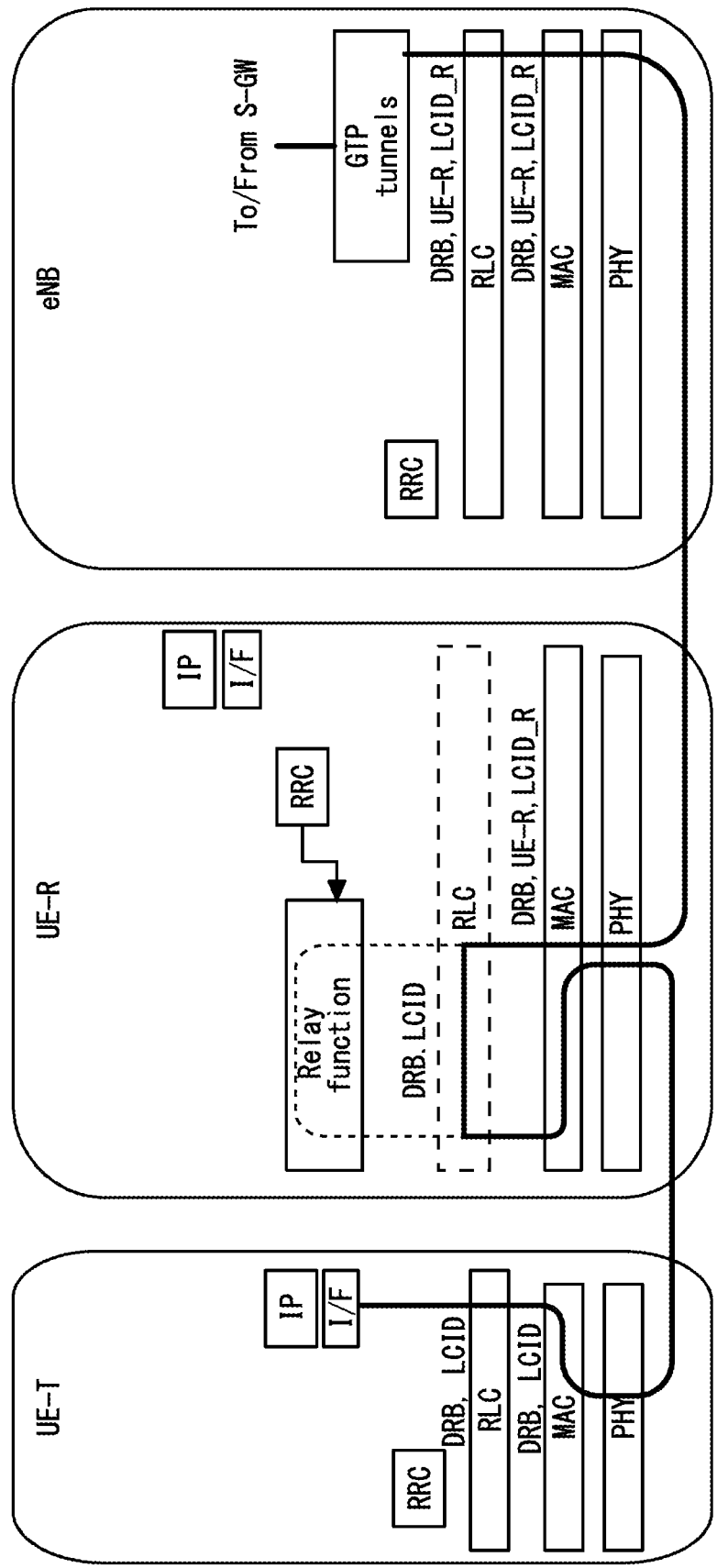
FIG. 5 illustrates the path of data during a relay.

FIG. 5 shows the path of data relayed through UET, UER and eNB layers. As previously described, the data are relayed above MAC or above RLC sub-layers (represented in dotted line in FIG. 5).

Before any relaying, signaling information between UEs has to be set up so as data related to UET can be conveyed via a relay UER. For example, the signaling information can be related to a signaling radio bearer.

In an embodiment, the configuration of the relay is processed in two steps. One step to configure the mapping for data relaying towards UET and one step to configure radio bearers used to carry those data.

Figure 6:
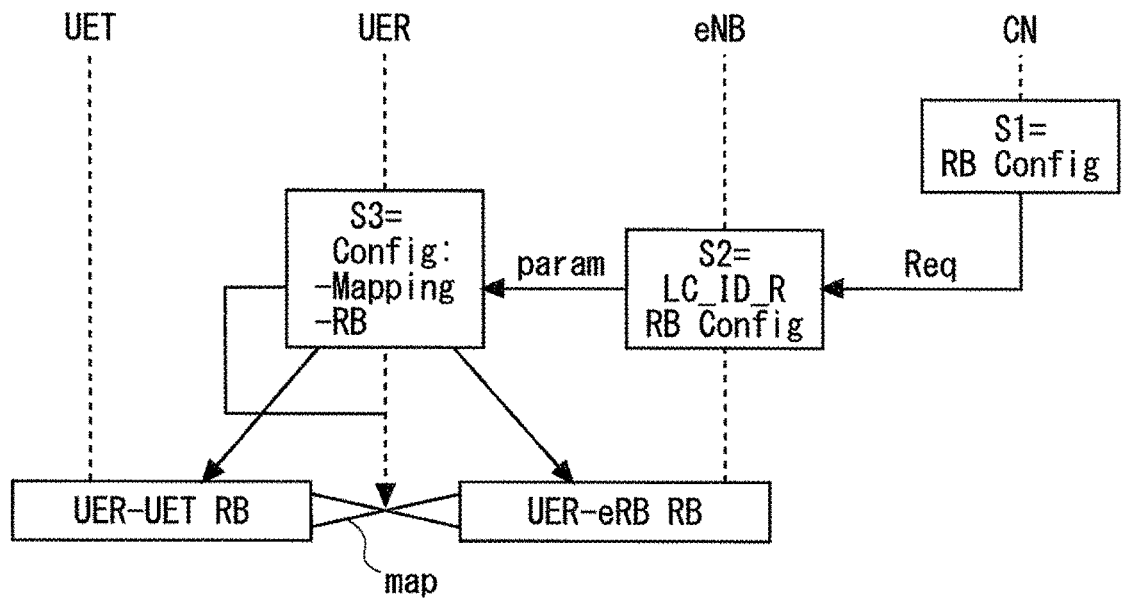
FIG. 6 is a flowchart representing the steps of a method for configuration of a relay according to an embodiment of the invention.

FIG. 6 represents the configuration process to initiate the relay. The mapping step and the radio bearer configuration step are not processed in a specific order: the mapping step can be processed before, after or in the same time as the radio bearer configuration step.

The core network CN initiates the procedure by setting-up a bearer configuration for the eNB. This step fills the field eRAB setup request (eRAB for evolved radio bearer) which is sent to the eNB. For example eRAB setup request includes the eRAB identification and/or the Quality of Service (QoS).

Then, the eNB generates control information needed to configure the relay at UER. This information includes mapping configuration information and radio bearer configuration information. For example:
- an identifier LC_ID for mapping a logical channel between UER and UET,
- a radio bearer configuration parameters set "UER-UET RB config" for a configuration of a radio bearer between UER and UET and
- a radio bearer configuration parameters set "UER-eNB RB config" for a configuration of a radio bearer between UER and eNB, can be generated.

Then, those data are sent to UER.

Then, UER performs the logical channel mapping and the radio bearer configuration. For example, an identifier LC_ID_R can be assigned to the logical channel between eNB and UER so as to designate the logical channel between UER and UET having the identifier LC_ID. These identifiers LC_ID_R and LC_ID are included in a RRC signaling message, providing thus information to perform the logical channels mapping. The UER-UET RB configuration and UER-eNB configuration parameters in the RRC signaling message further provide information for the radio bearers configuration.

After the configuration, the data relaying can be performed through UER layer 2.

It should be understood that the identifier LC_ID can designate the logical channel between UER and UET but the identifier LC_ID_R, when received at UER with data from eNB and intended to UET, is interpreted by UER as designating the logical channel between UER and UET, for forwarding the received data. Reversely, the identifier LC_ID_R can designate the logical channel between UER and eNB but the identifier LC_ID, when received at UER with data from UET and intended to eNB, is interpreted by UER as designating the logical channel between UER and eNB, for forwarding the received data.

In brief, referring to FIG. 6, in a first step S1, the core network CN defines a setup of the radio bearers configuration and sends to the eNodeB (eNB) a request Req for a eRAB setup.

Upon reception of the request Req, in a second step S2, the eNB generates:
- the identifiers LC_ID_R and LC_ID, for the logical channels mapping,
- the parameters set UER_UET RB config, for the configuration of the radio bearer between the target entity UET and the relay entity UER, and
- the parameters set UER_eNB RB config, for the configuration of the radio bearer between eNB and the relay entity UER.

The identifier and the parameters sets are then sent to the relaying entity UER (arrow referenced "Param" in FIG. 6), for example in the content of a message such as an RRC Connection Reconfiguration message (RRC for "Radio Resource Control"). Advantageously, the kind of such a message already exists and the invention can be implemented without any need of deep modifications. In step S3, the relaying entity UER performs the mapping of a logical channel between the UER and the UET, this logical channel having an identifier LC_ID. Moreover, radio bearers are configured between the target entity and the relay entity (UER-UET RB), and between the eNodeB and the relay entity (UER-eNB RB).

Figure 7:
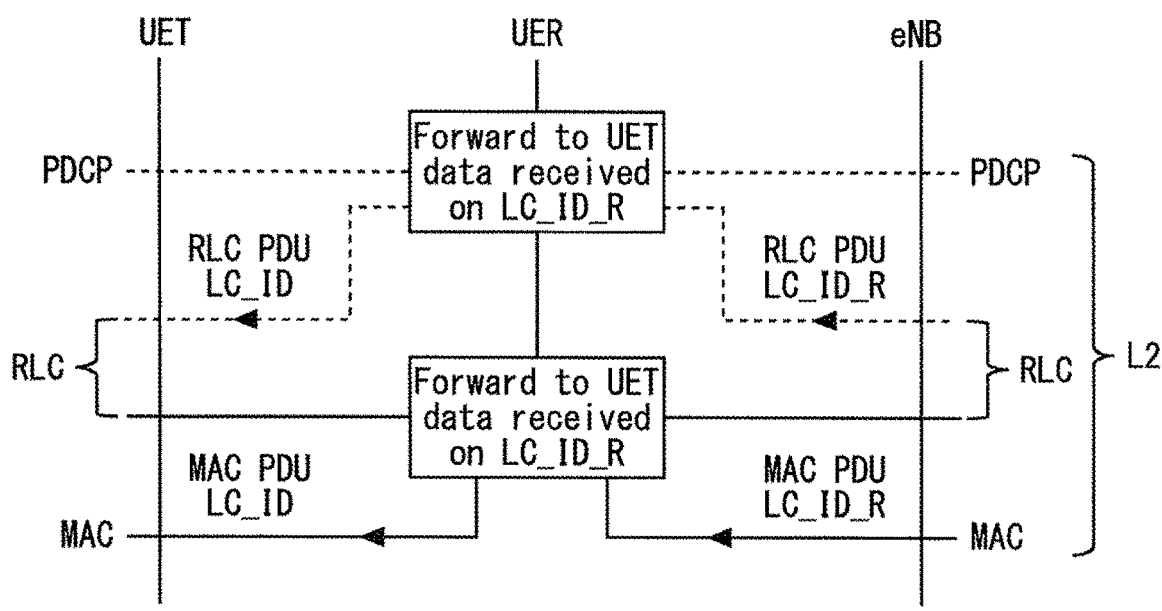
FIG. 7 represents the data relaying according to an embodiment of the invention.

After this configuration, the system is designed so that data to be transferred between the eNB and the target UET are relayed through the relay UER as described hereafter and shown on FIG. 7.

FIG. 7 depicts the data relaying. Layer 2 (L2) is subdivided in three sub-layers: respectively PDCP, RLC and MAC sub-layers.

At each level, two entities (eNB and UER for example) interact by means of layer protocol (PDCP, RLC or MAC protocol) by transmitting Protocol Data Units (PDU). This "transmission" is an abstraction in fact (actually, data is encapsulated through lower layers to be physically transmitted through the physical layer, e.g. layer 1).

In an embodiment, data is relayed above the MAC sub-layer. This means that MAC PDUs are forwarded at the RLC sub-layer level.

In another embodiment, data is relayed above the RLC sub-layer. This means that RLC PDUs are forwarded at the PDCP sub-layer level. This embodiment is represented by dotted lines in FIG. 7.

In both cases, data are mapped:
thanks to the identifier "LC_ID_R" between UER and eNB, and
thanks to the identifier "LC_ID" between UER and UET.

As the configuration steps S1, S2, S3 provide the mapping configuration explained above, the relay entity UER is able to interpret that data identified by "LC_ID_R" are to be forwarded to the target entity UET (which can be a terminal in the network, or another relay node for hoping a communication through several relay nodes for example).

In an embodiment, the UER is used for relaying of Non-Access Stratum (NAS) signaling with the UET. Non-Access Stratum signaling allows mobility of the UE through different nodes. In such an embodiment, the UET is signaled even if it is out of eNB range.

Figure 8A:
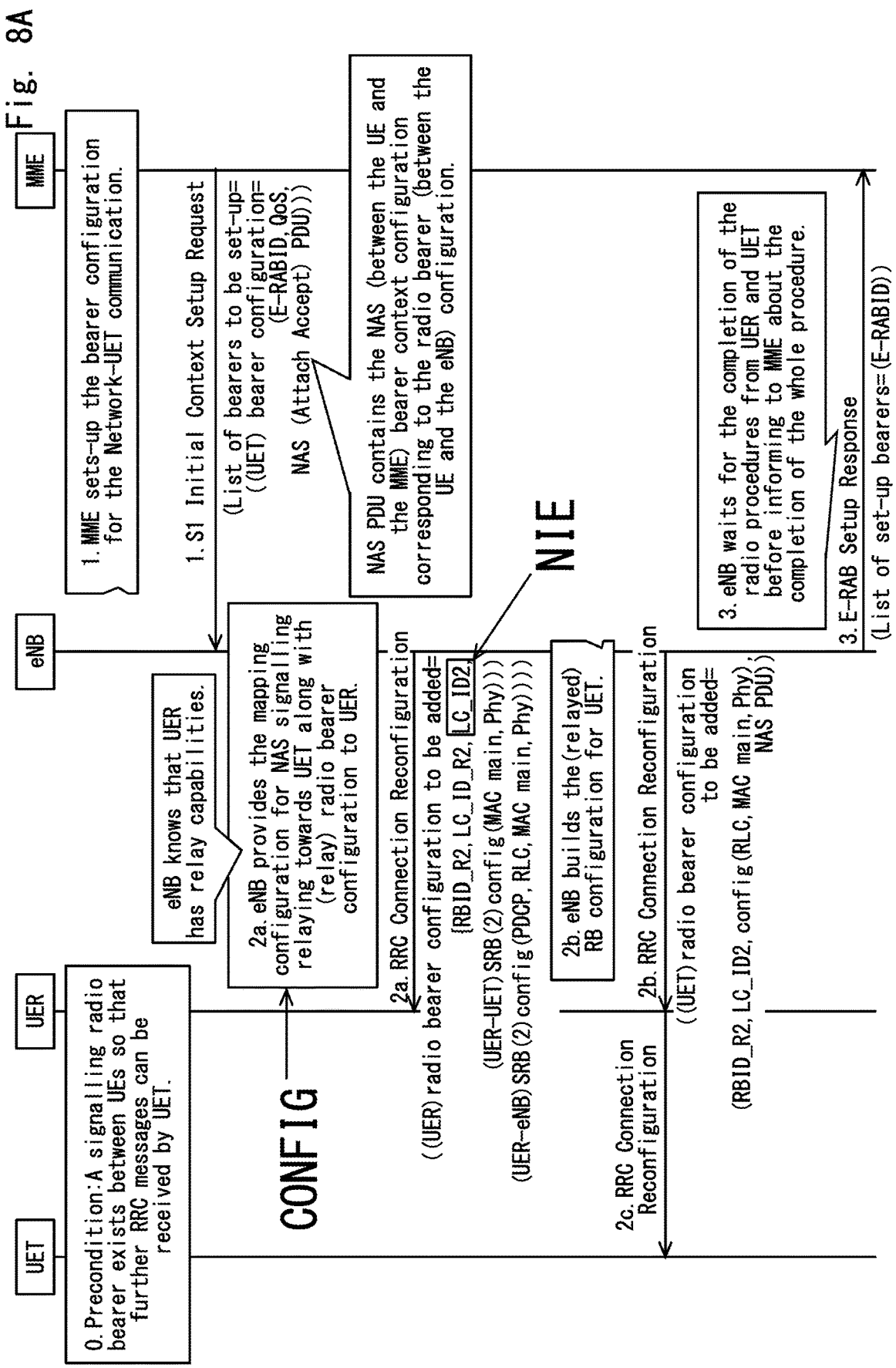
FIG. 8A is a flowchart representing the configuration of a relay in a general case.

As described above, relay can be done above MAC sub-layer or above RLC sub-layer. FIG. 8A globally depicts relay of NAS signaling and FIGS. 8B and 8C respectively describe the above MAC and above RLC case. These Figs. provide details for implementation of the present invention, particularly for implementation with respect to 3GPP LTE standard.

In FIG. 8A, a Mobility Management Entity (MME), which can be part of the core network CN for LTE, sets up the bearer configuration. This set-up allows the transmission of NAS PDU (NAS is a layer 3 sub-layer). With such information, the UER provides the mapping configuration and the radio bearer configuration for the relay (CONFIG in FIG. 8A). This step allows adaptation of RRC Connection Reconfiguration for relay which includes new information element (NIE).

Figure 8C:
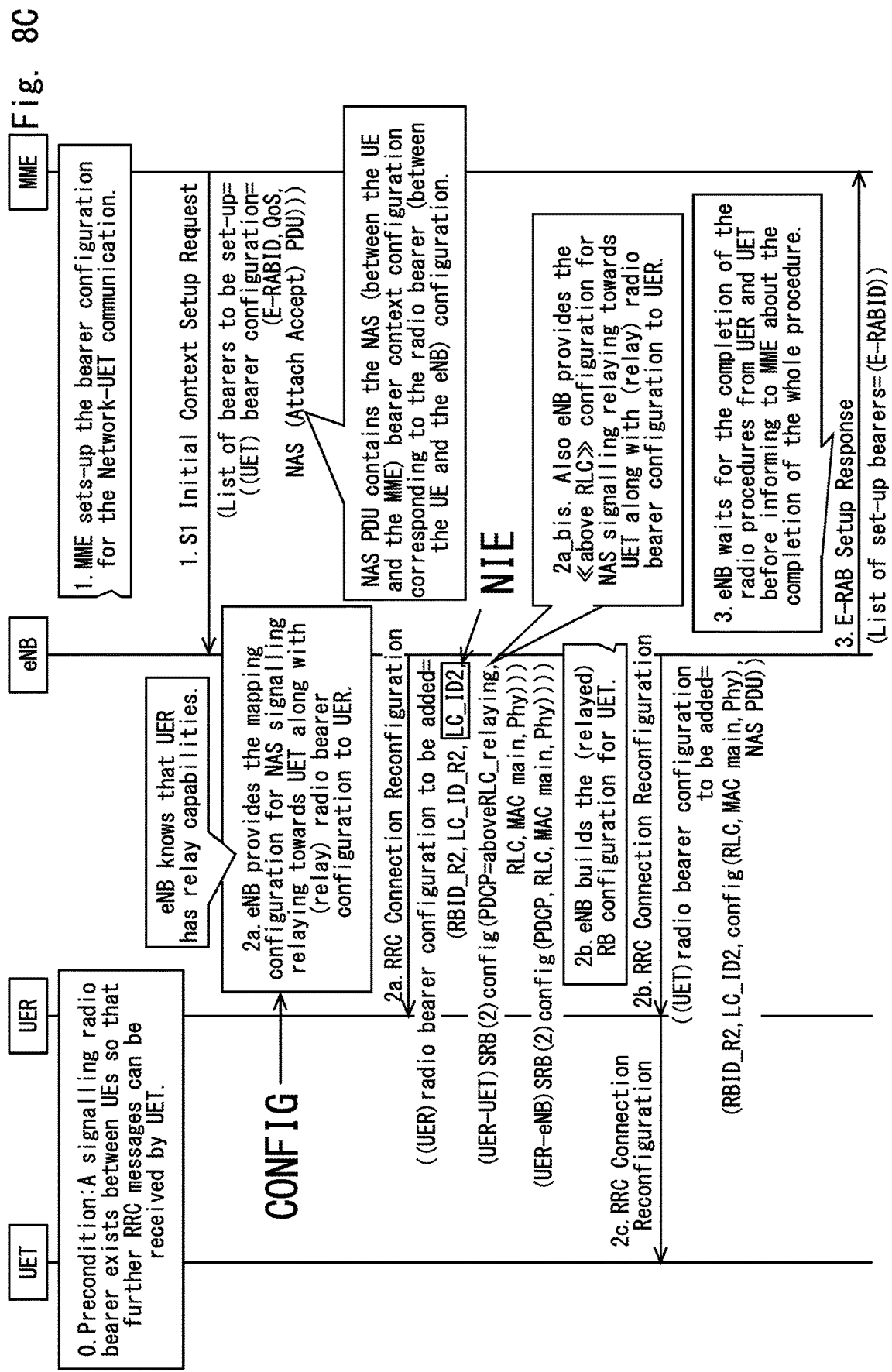
FIG. 8C is a flowchart representing the configuration for NAS signalling of a relay in an "above RLC" case.

FIGS. 8B and 8C point out differences between above MAC relaying and above RLC relaying. In the 3GPP LTE implementation, this difference is particularly visible in the (UER-UET) SRB(2) config field.

Figure 9A:
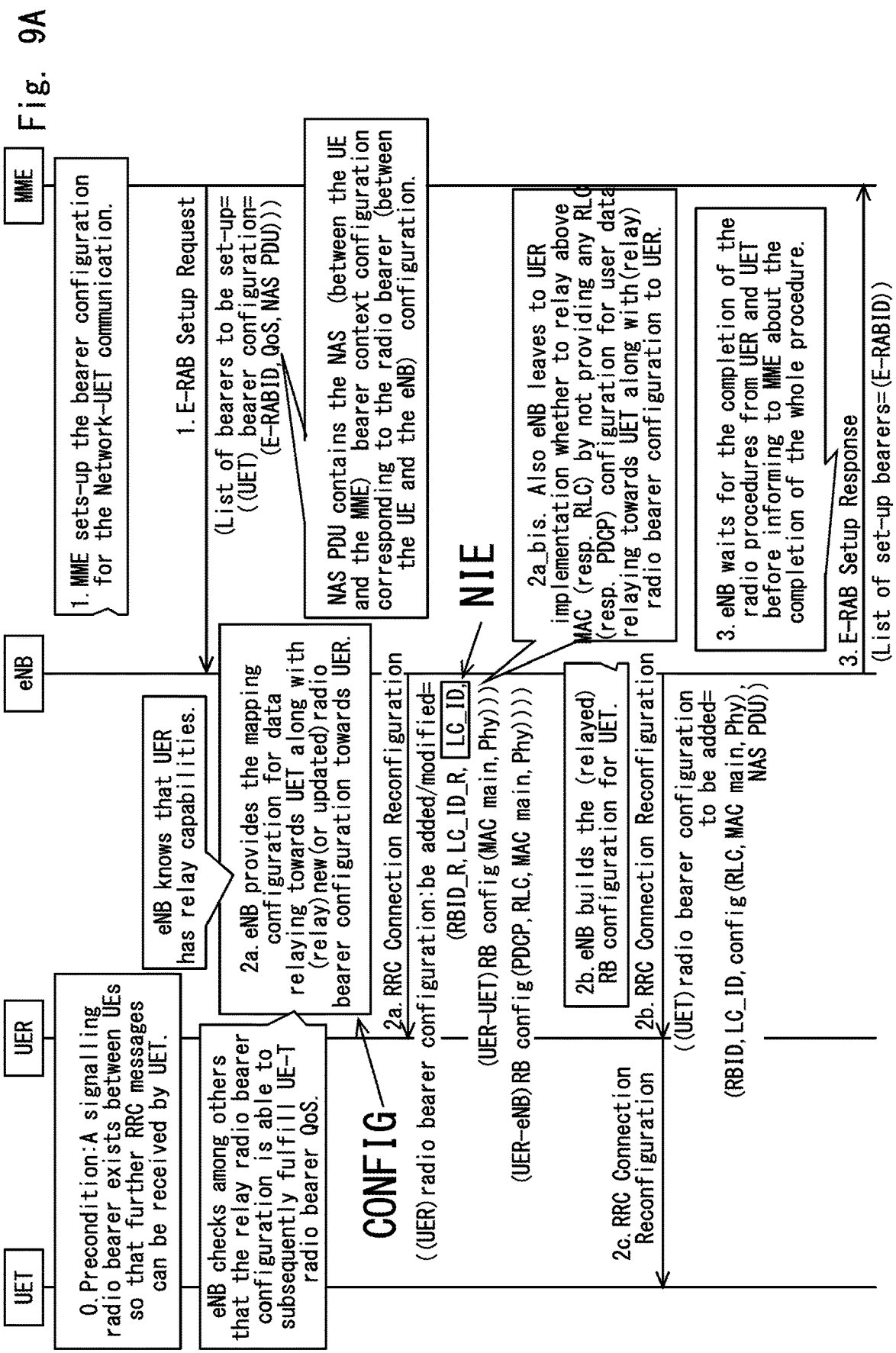
FIG. 9A is a flowchart representing the configuration for data relaying of a relay in a general case.
Figure 9C:
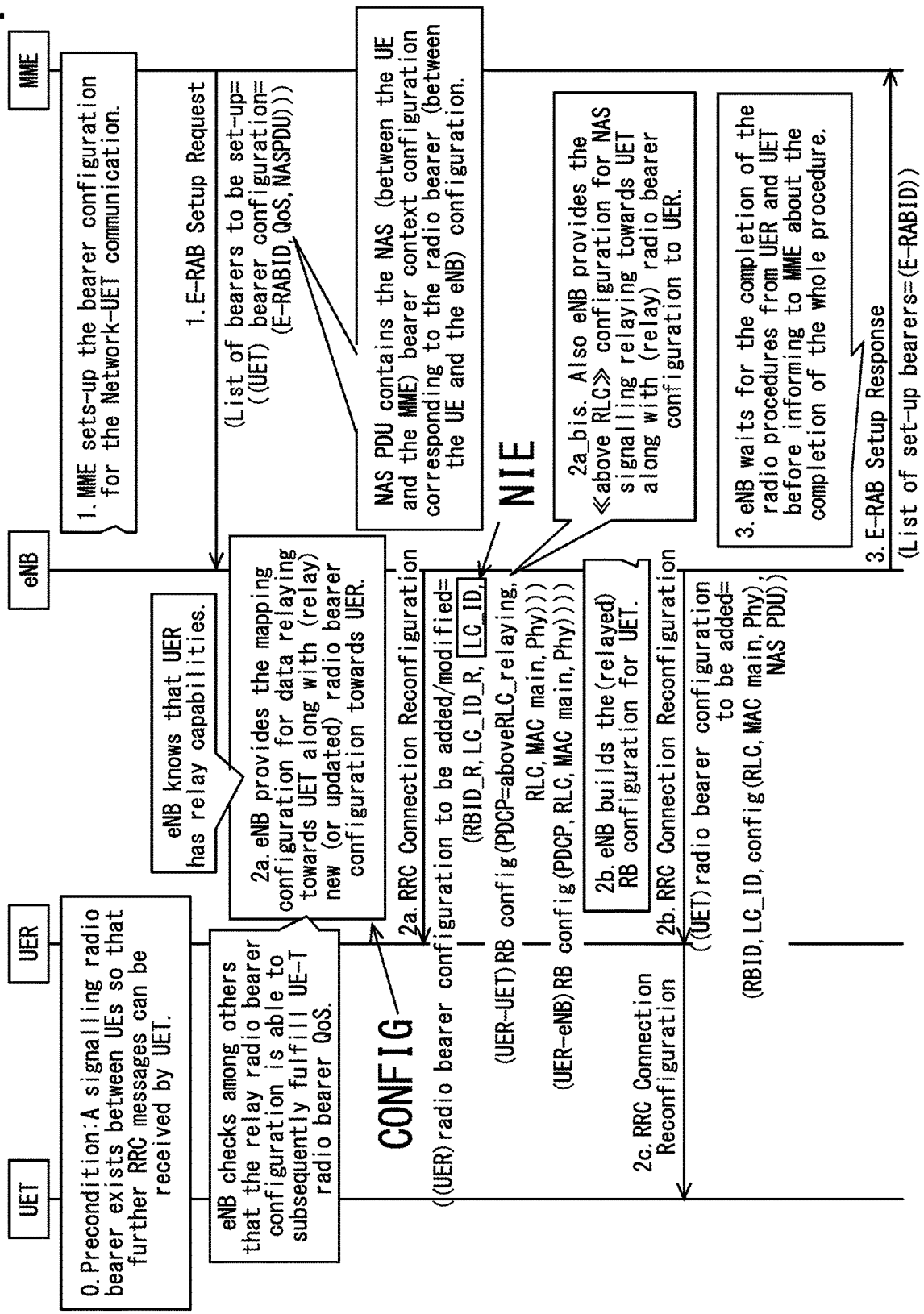
FIG. 9C is a flowchart representing the configuration for data relaying of a relay in an "above RLC" case.

In a further embodiment, relaying is performed because the UET has requested communication towards the network via the UER or because the UET, while communicating with the network, has moved out of coverage of the network. As described above, relaying can be done above the MAC sub-layer or above the RLC sub-layer. FIG. 9A globally shows the configuration procedure for the relay of data and FIGS. 9B and 9C respectively show the above MAC and the above RLC cases. These Figs. provide details for implementation of the present invention, particularly for implementation with respect to 3GPP LTE standard. FIGS. 9B and 9C point out differences between above MAC relaying and above RLC relaying. In the 3GPP LTE implementation, this difference is particularly visible in the (UER-UET) RB config field.

Figure 10A:
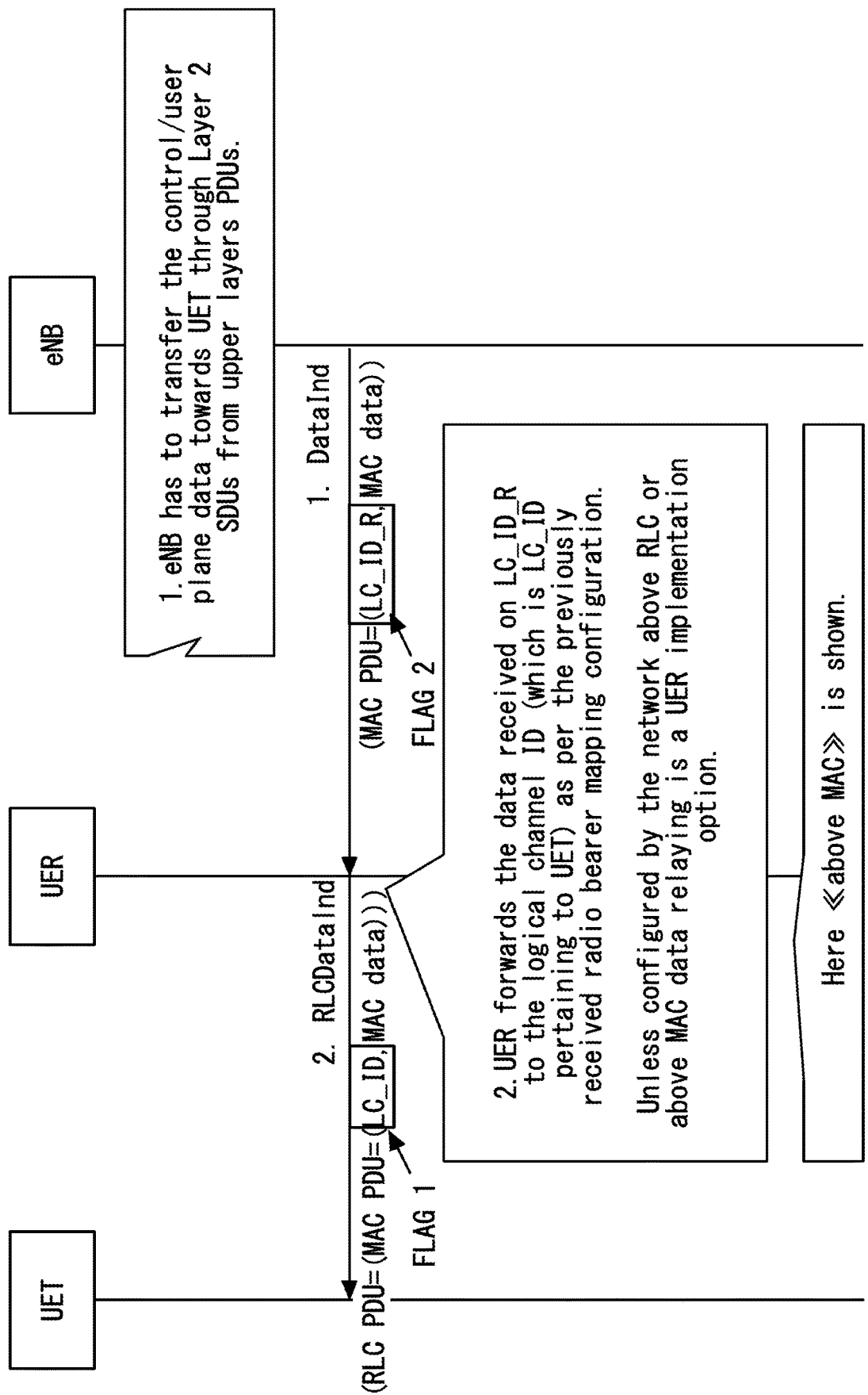
FIG. 10A is a flowchart representing data relaying in an "above MAC" case in the downlink direction.

FIGS. 10A and 10B respectively describe a possible implementation to perform data relaying in the above MAC case and in the above RLC case. A Service Data Unit (SDU) is a specific unit of data that has been passed down from an OSI layer to a lower layer, and which the lower layer has not been encapsulated yet into a protocol data unit (PDU). As MAC sub-layer is a lower sub-layer than RLC sub-layer, MAC PDU is included in RLC PDU. Flags are included in MAC PDU for the UER to relay data.

In FIGS. 10A to 11, FLAG 2 is used to indicate to UER that MAC data contained in this MAC PDU are intended to the UET via relay. FLAG 1 is the 'usual' flag used without relay so that the UET receives data contained in MAC PDU as if these data come directly from the eNB. As previously described, data are mapped thanks to FLAG 2 between the UER and the eNB and thanks to FLAG 1 between the UER and the UET. As the configuration steps provide the mapping configuration, the UER is able to interpret and simply forward data identified by FLAG 2. These Figs. provide details for implementation of the present invention, particularly for implementation with respect to 3GPP LTE standard. FIG. 11 provides details for implementation of the present invention in the uplink case, particularly for implementation with respect to 3GPP LTE standard.

Therefore, in brief, the present invention proposes, in an embodiment, to provide the Radio Access Network (RAN) with a logical channel mapping configuration along with radio bearers configuration for data relaying towards a target entity UET with the use of a relay entity UER. In an embodiment, the invention provides additional information meaning that the radio bearers configuration is performed for relaying purpose (addition of an identifier LC_ID for example). Such information, at least, can be included in a pre-existing RRC Connection Reconfiguration message (RRC for "Radio Resource Control").

In an embodiment, the invention provides an "above MAC" (plain line of FIG. 7) or an "above RLC" (dashed line of FIG. 7) data relaying configuration, according to a choice of optimization which can be, for example, decided at first in the network. Of course, such a choice can depend also on the relay entity capacities and/or construction.

Furthermore, if RAN does not provide any above RLC configuration, then the UER can perform above MAC data relaying. This choice of implementation in the UER can be dictated by the radio bearer quality of service.

For the downlink direction, the relay entity UER forwards the data received on a logical channel flagged with a specific identifier (for example LC_ID as previously described) to a next hop logical channel as per a logical channel mapping configuration previously defined. Unless configured by the network as described above, "above RLC" or "above MAC" data relaying can be an option according to the UER capacities and/or construction, as indicated above. If UER performs "above RLC" data relaying, then PDCP data is conveyed from UER to a next hop UET (which can be a relay for a further target). If UER performs "above MAC" data relaying, then RLC data is conveyed to next hop UET.

For the uplink direction, the UER transparently (i.e. without decoding) forwards the data received on the logical channel towards the network using the logical channel identified with a specific identifier (LC_ID for example) of the configured relay bearer as per the previously received logical channel mapping configuration.

Of course, a same UE can relay several communications. Therefore, several identifiers LC_ID can be used to that end (with a logical channel for each UE target to be reached). Moreover, a same communication can be relayed by several UEs (generating several successive logical channels) and several identifiers LC_ID can be used to that end also.

The present invention can also be embedded in a computer program product, which includes all the features enabling the implementation of the methods described herein, and which, when loaded in an information processing system (for example in a user equipment UER), causes the information processing system. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may include computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

INCORPORATION BY REFERENCE

This application is based upon and claims the benefit of priority from European Patent Application No. EP 12306301.8, filed on Oct. 19, 2012, the disclosure of which is incorporated herein in its entirety by reference.

The invention claimed is:

1. A method, performed by a first user equipment configured to support relay communication between a network node entity and a second user equipment, the method comprising:
    receiving, from the network node entity, information which comprises a first Layer 2 identifier to identify a connection between the network node and the first user equipment which supports relay communication;
    mapping the first Layer 2 identity to a second Layer 2 identity, wherein the second Layer 2 identity identifies a direct link between the first user equipment which supports relay communication and the second user equipment; and
    communicating with the second user equipment based on the second Layer 2 identity.

2. The method of claim 1, wherein the first Layer 2 identity is a source Layer 2 ID that identifies a sender of data in communication via the direct link.

3. The method of claim 1, wherein the second Layer 2 identity is a destination Layer 2 ID that identifies a destination of data sent in communication via the direct link.

4. The method of claim 1, wherein the first user equipment, configured to perform relay communication, also is configured to provide end-to-end service between the first user equipment and a core network.

5. A first user equipment configured to support relay communication between a network node entity and a second user equipment, the first user equipment comprising:
    a transceiver circuit configured to receive, from the network node entity, information which comprises a first Layer 2 identity to identify a connection between the network node and the first user equipment which supports relay communication; and
    a processor to map the first Layer 2 identity to a second Layer 2 identity, wherein the second Layer 2 identity identifies a direct link between the first user equipment which supports relay communication and the second user equipment,
    wherein the transceiver circuit is further configured to communicate with the second user equipment based on the second Layer 2 identity.

6. The first user equipment which supports relay communication of claim 5, wherein the first Layer 2 identity corresponds to a source Layer 2 ID that identifies a sender of data in communication via the direct link.

7. The first user equipment which supports relay communication of claim 5, wherein the second Layer 2 identity corresponds to a destination Layer 2 ID that identifies a destination of data sent in communication via the direct link.

8. The user equipment configured to support relay communication of claim 5, wherein the first user equipment, configured to perform relay communication, also is configured to provide end-to-end service between the first user equipment and a core network.

* * * * *